United States Patent Office 3,015,647
Patented Jan. 2, 1962

3,015,647
CURABLE PRODUCT FROM A HALOHYDRIN AND PHENOL CONDENSATION PRODUCT
Elizabeth S. Lo, Princeton, N.J., assignor to Johnson & Johnson, a corporation of New Jersey
No Drawing. Filed Oct. 31, 1958, Ser. No. 770,933
12 Claims. (Cl. 260—47)

This invention relates to novel curable epoxy resins having improved solvent resistance and improved heat distortion properties.

As is well known to those familiar with organic and plastic compositions, considerable work has been done on the development of curable epoxy resins useful in many industries as coatings, molding compositions, etc. These epoxy resins in general are formed by the reaction of a polyhydric compound with an epihalohydrin in an alkaline medium. Although many of the heretofore known epoxy resins possess a number of desirable physical characteristics, very often they are deficient in resistance to solvents and resistance to distortion at elevated temperature.

Accordingly, it is an object of this invention to provide a novel method for the production of curable epoxy resins having improved resistance to solvents and resistance to distortion at elevated temperatures. A further object of the invention is to provide novel curable epoxy resins having improved resistance to distortion at elevated temperatures.

It has been found that the above objects may be realized by reacting in an alkaline medium a halohydrin of the epihalohydrin or polyhalohydrin type with a phenol condensation product formed by reacting a phenol and a cyclic anhydride or dibasic acid which under proper conditions form a cyclic anhydride. In general, the molar ratio of the halohydrin ether to the phenol condensation product is at least 1.5:1 to 15:1. In general, the reaction is carried out at a temperature in the range of about 50 to about 150° C., and preferably of about 80 to about 130° C., for a time in the range of about ⅓ hour to about 7 hours, and preferably of about ½ hr. to about 4 hours. Of course, a high reaction temperature requires a lower reaction time.

The phenol condensation products useful in this invention may be prepared according to the method described by Daas, Teware and Dutt, Proc. Indian Acad. Sci. 13A 68 (1941) and 14A (1941). More particularly, these condensation products used in this invention are prepared by reacting a phenol type compound selected from the group consisting of phenols and substituted phenol, such, for example, as alkylated phenols, arylated phenols and halogenated derivatives of the foregoing with a compound selected from the group consisting of phthalic, maleic, succinic, naphthalic, and sulfonephthalic anhydrides and acids, as well as substituted derivatives thereof such, for example, as alkylated and halogenated derivatives of the foregoing. The molar ratio of the phenol compound to the cyclic compound is at least 2:1. These condensation products in general are of the following structures:

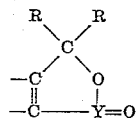

or

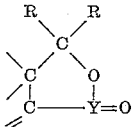

where R is a radical selected from the group consisting of a hydroxy phenyl radical and substituted derivatives thereof such, for example, as alkylated and halogenated derivatives and Y is selected from the group consisting of C atom and S group.

Examples of phenol condensation products useful in accordance with this invention are phenolphthalein (reaction product of phenol-phthalic anhydride), cresolphthalein (reaction product of cresol-phthalic anhydride), phenolmalein (reaction product of phenol and maleic anhydride), thymolsulfonephthalein (reaction product of thymol and sulphonephthalic anhydride), orthocresolsulfonephthalein (reaction product of orthocresol and sulphone phthalic anhydride), cresolmalein (reaction product of cresol-maleic anhydride), phenol succein (reaction product of phenol and succinic anhydride), and phenolnaphthalein (reaction product of phenol and naphthalic anhydride).

Examples of halohydrins useful in producing epoxy resins in accordance with this invention are dihalohydrins such, for example, as dichlorohydrins as exemplified by bis (3-chloro-2-hydroxy propyl) ether, 1,4-dichloro-2,3-dihydroxy butane, 1,4-dihydroxy-2,3-dichloro butane, 1,4-dichloro-2,3-dihydroxy cyclohexane and dihalohydrins derived from divinyl benzenes, for example, by the addition thereto of two mols of hypohalous acids, etc. Also useful in forming epoxy resins in accordance with this invention are epihalohydrins such, for example, as epichlorohydrin.

The epoxy resins produced in accordance with this invention are diglycidyl, polyglycidyl and polyhydroxy ethers and esters of the phenol condensation product.

The molecular weights of these glycidyl ethers and esters vary with the amount of halohydrin used and also with the reaction conditions. Upon addition of less than or nearly equivalent amount of the halohydrin to a condensation product of a phenol and an anhydride, a high molecular weight epoxy resin is obtained. By using larger amounts of halohydrin lower molecular weight products are obtained. The epoxy ring is extremely sensitive toward water in the presence of an alkaline material. Some hydrolysis occurred even at a water concentration of 2%.

In view of the complex structure of the polymeric epoxies formed in accordance with this invention, it is not possible to set forth a definite molecular structure for these polymeric materials. Experimental data appear to prove that the monomeric diglycidyl products of this invention have a relatively simple structure.

To illustrate, the diglycidyl product of phenolphthalein will be used as an example. It is prepared by reacting phenolphthalein with a large excess of epichlorohydrin. The pale yellow material obtained consists predominantly of the desired product. It has an epoxy value approximately equivalent to two glycidyl groups per molecule and a saponification value approximately equivalent to one ester group per molecule. This appears to be contrary to the commonly known fact that when epichlorohydrin is reacted with a mixture containing both a phenolic OH and an organic acid compound, the formation of an ether is predominant. With the diglycidyl product produced by the present invention, this phenomenon does not occur. This indicates that the epichlorohydrin has reacted with only one phenolic OH and a carboxylic acid group. It appears that the other phenolic OH is absent during the reaction.

Accordingly, diglycidyl products formed in accordance with this invention would appear to have the following general formula:

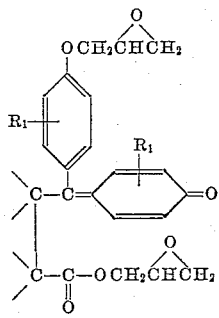

wherein $R_1$ is selected from the group consisting of hydrogen atom, halogen atom and an alkyl group.

The epoxy resins of this invention may be prepared by three different modifications which may be designated (a) aqueous alkaline medium method, (b) nearly anhydrous method, and (c) anhydrous method. Each of these methods will now be described hereinbelow employing in each instance phenolphthalein as the phenol condensation product and epichlorohydrin as the halohydrin ether.

*Example I*

This example illustrates the preparation of novel epoxy resins by the aqueous alkaline medium method.

One mole phenolphthalein or one of its analogues is mixed with 1.5 mole (to 4 moles) of epichlorohydrin and heated to 100° C. A 10% (up to 50%) aqueous alkaline solution containing two to three moles of NaOH is dropped into the hot solution and kept refluxing about 30 minutes to three hours depending upon the type of final product desired. The presence of alkaline water at refluxing temperature tends to hydrolyze the epoxy ring. By regulating the water present in the reaction medium, it is possible to regulate the epoxy equivalent and molecular weight of the product.

The product is separated from the reaction mixture by decantation. The unreacted epichlorohydrin and the last trace of water are removed by vacuum distillation. The resin can be cured to a thermosetting material by reacting with amines, dibasic acids or anhydride hardeners.

*Example II*

This example illustrates the preparation of novel epoxy resins by the nearly anhydrous method. This method is described in detail in U.S. Patent No. 2,801,227.

The apparatus employed is a reaction flask equipped with a mechanical stirrer, a dropping funnel to admit conc. alkaline solution (between 30 to 50% solution) a thermometer and a vapor take-off to which was fitted a water-cooled condenser and a condensate collector and a separating column with a return to convey the lower epichlorohydrin layer to the reaction vessel. The separating column also has a drawoff for the upper water layer.

Phenolphthalein (1 mole) or one of its analogues is mixed with 6 moles (up to 15 moles) of epichlorohydrin which serves as a partial solvent and also as an azeotropic reagent to remove water during the reaction.

The concentration of water in the reaction flask may be regulated between 0.5 to 1.5% by dropping the conc. NaOH solution slowly so that the instant the alkaline solution hits the reaction mixture, water is removed by forming an azeotropic mixture with the excess epichlorhydrin and distilled off. The principle is similar to any esterification in organic reactions using benzene as an azeotropic reagent to remove water of reaction.

This method of resin preparation usually gives a higher epoxy equivalent and a lower viscosity product than the aqueous alkaline medium method. The separation of resin, salt, excess epichlorohydrin and the small amount of water is accomplished by centrifuging, filtration and vacuum distillation (155° C. pot temperature/2 mm. pressure).

*Example III*

This example illustrates the preparation of novel epoxy resins by the anhydrous method.

The dipotassium salt of phenolphthalein (or one of its analogues) is prepared by reacting phenolphthalein with potassium hydroxide in absolute ethanol.

The dipotassium salt is then reacted with excess epichlorohydrin at 100° C. for one hour. The resin and the excess epichlorohydrin are separated from the salt by filtration. The excess epichlorhydrin is removed by vacuum distillation. This method also gives the resin prepared a higher epoxy equivalent and a low viscosity value. Due to economic reasons, the method of Example II is often preferred.

The epoxy resins formed in accordance with this invention are either viscous liquids or solids. These novel epoxy resins are particularly useful as protective coatings and as insulating materials, potting compositions and encapsulating material for electrical systems. They can be cured to rigid thermosetting resins by any of the epoxy resin curing agents, such, for example, as amines, polybasic acids or anhydrides with or without heating. Examples of suitable amine hardeners for the epoxy resins of this invention are: methane diamine, phenylene diamines, ethylene diamine, triethylene tetramine, dianiline sulfone, dianiline methane, dimethyl ethanolamine, dimethylaminopropionitrile, benzyl dimethylamine, dimethyl aniline and methyl diethanolamine. Typical acid and anhydride hardeners which may be employed are: dodecyl succinic anhydride, pyromellitic dianhydride, boron trifluoride, phthalic anhydride and hexahydrophthalic anhydride.

The following Examples IV–XII are given in order to illustrate additional specific examples of epoxy resins formed in accordance with this invention:

*Example IV*

159 grams of phenolphthalein (0.5 mole) was suspended in 463 grams of epichlorohydrin (5.0 moles) and placed in a 1-l., 3-n flask. It was heated to 110° C. with stirring. An aqueous sodium hydroxide solution (41 g. NaOH in 50 cc. water) was dropped into the reaction mixture at such a rate that a pot temperature remained between 105–117° C. during the four hours of addition. All during the addition the azeotropic mixture of water and epichlorhydrin was distilled and condensed in the trap. The upper layer containing mainly water and some dissolved epichlorhydrin was drained and discarded. The lower layer containing mainly epichlorhydrin was returned to the reaction vessel. Heating was continued for an additional ½ hour after all the caustic was added. The pale yellow slightly viscous solution was separated from the salt by filtration. The salt was washed with a little benzene and filtered. The filtrates were combined. Benzene, water and large part of the unreacted epichlorohydrin were removed by distillation at 150° C. and 15 mm. pressure. The last traces of epichlorhydrin were removed by distillation at 166° C. and 2 mm. pressure. A pale yellow viscous liquid (165 g.) was obtained. It has an epoxy value of 0.38 epoxy equivalent per 100 grams of the viscous liquid and contains 2.07% Cl and 0.02% ash. Its saponification value is 128 (theo. 130).

One hundred grams of the viscous liquid was mixed with 16.5 g. of menthane diamine and heated for two hours at 93° C. followed by four hours at 150° C. This cured thermosetting resin had an excellent heat distortion value of 161° C. and an outstanding solvent resistance. The percent of weight increase at room temperature after immersion in acetone after eleven days was 0.77%, while after immersion in chloroform for seven days the percent of weight increase was 4.2%.

The heat distortion value for bisphenol A resin (known as epoxy resin) prepared and cured by the same method is 137° C. After immersion in acetone the product had a soft jelly-like structure and the percent of weight increase was −3.3%. This fact indicated that this resin was partially soluble in the solvent. The cured bisphenol A resin is partially soluble in chloroform and forms an oily layer floating on the top of the chloroform solution.

*Example V*

318 grams of phenolphthalein (1 mole) was suspended in 555 grams of epichlorohydrin (6 moles) and placed in a 1-l., 3-n flask. The mixture was heated to 110° C. with stirring. An aqueous NaOH solution (80 g. in 80 cc. of water) was added to the mixture for half an hour. Temperature of the reaction mixture was maintained between 98–110° C.

After the addition of the alkaline solution was completed, toluene (50 g.) was added to the reaction mixture. Water was removed by forming azeotropic mixtures with toluene and epichlorohydrin.

The yellow resin was separated from salt, unreacted epichlorohydrin, toluene and water by essentially the same procedure as was shown in Example IV. It has an epoxy value of 0.35 epoxy equivalent per 100 grams of resin and contains 3.11% Cl and no ash. Its saponification value is 132 and melts about 30° C.

*Example VI*

159 grams of phenolphthalein (0.5 mole) was suspended in 185 grams of epichlorohydrin (2 moles) and heated to 110° C. with stirring. An aqueous solution of sodium hydroxide (60 g. in 60 cc. of water) was added to the mixture and the product was kept refluxing for two hours. The very pale yellow resin was separated from the reaction mixture by decantation. It was boiled in water and washed three to four times with water to remove salt. The resin has an epoxy value of 0.03 epoxy equivalent per 100 grams of resin. This glycidyl polyhydroxy ether, ester resin of phenolphthalein has a M.P. of 48° C.

Esterification of this resin with vegetable oil forms a flexible protective coating material.

*Example VII*

Phenolphthalein (1 mole) was suspended in epichlorohydrin (1.8 moles) and 2-butanone (2 moles). The latter was used as a solvent. A 25% aqueous alkaline solution (containing 2 moles of NaOH) was added to the reaction mixture.

After the alkaline addition, the temperature was maintained at 80° C. for two hours. A pink viscous solution was obtained. Excess dilute HCl (about 10%) was used to neutralize the reaction mixture. 2-butanone and excess HCl were removed by steam distillation. The pale yellow solid resin was precipitated during the distillation. It was boiled in water to remove salt. The resin has an epoxy equivalent of 0.021, a saponification value of 124 and a melting point of 150–152° C. It contains 2.6% Cl and 0.3% ash.

*Example VIII*

The dipotassium salt of phenolphthalein was prepared by reacting phenolphthalein (1 mole) and potassium hydroxide (3 moles) in absolute ethanol (2000 cc.). The red dipotassium salt (0.125 mole) was then mixed with epichlorohydrin (3.75 moles) in a 3-necked flask fitted with stirrer, condenser and thermometer. The reaction mixture was heated to 95°–98° C. and kept at that temperature for one hour. The viscous orange solution was separated from the salt (KCl) by filtration. The excess epichlorohydrin was removed by vacuum distillation at 155° C. and 15 mm. pressure. It has an epoxy value of 0.37 epoxy equivalent per 100 grams of resin and contains 5.67% Cl and no ash. The saponification value is 146.

*Example IX*

172 grams of o-cresol phthalein (0.5 mole) was reacted with 463 grams of epichlorhydrin (5 moles) in the presence of alkaline medium (40.8 g. NaOH in 60 cc. water). The reaction and the isolation of product were carried out essentially the same as in Example IV. This resin of o-cresol phthalein has an epoxy equivalent of 0.36 and contains 1.2% Cl and 0.07% ash. One hundred grams of this viscous resin was mixed with 16 g. of menthane diamine and heated for two hours at 93° C. followed by four hours at 150° C. This cured resin has an excellent heat distortion value of 154° C.

*Example X*

About 1200 g. of phenolphthalein resin were made. The reaction and the isolation of resin were carried out essentially the same as Example IV.

The weights of reactants used were as follows:

| | G. |
|---|---|
| Phenolphthalein (3 moles) | 954.9 |
| Epichlorohydrin (30.25 moles) | 2800 |
| NaOH (6.12 moles) | 244.8 |

A pale yellow resin (1225 g.) is obtained. It has a melting point of 48° C. and an epoxy value of 0.37 epoxy equivalent per 100 grams of resin. Its saponification value is 146. The resin contains 1.9% Cl and 0.05% ash. It can be cured to a thermosetting resin by reacting with dodecyl succinic anhydride in presence of a small amount of tertiary amine.

*Example XI*

M-cresol malein was prepared by reacting m-cresol (3 moles) with maleic anhydride (1 mole) in the presence of concentrated sulfuric acid (2 moles) at 115–120° C. for 12 hours. The sample was purified according to Dass and Tewari, Proc. Indian Acad. Sci. 13A 68 (1941).

The glycidyl ether, ester of m-cresol malein can be made by reacting 29.6 grams of m-cresol malein (0.1 mole) with 92.52 grams of epichlorohydrin (1 mole) in the presence of sodium hydroxide (8 g. in 20 cc. of water) in the same manner as that of Example IV.

The resin reacted with dianiline sulfone would give a hard thermosetting resin having good thermal stability and solvent resistance.

*Example XII*

Phenol succinein was prepared according to Dass and Tewari, Proc. Indian Acad. Sci. 13A 68 (1941).

The glycidyl ether, ester of phenol succinein can be prepared essentially the same as that of m-cresol malein in Example XI. The weights of the starting material used are as follows:

| | |
|---|---|
| Phenol succinein | 27 g. (0.1 mole). |
| Epichlorohydrin | 92.53 (1 mole). |
| NaOH | 8 g. (0.2 mole). |

The following example illustrates the preparation of a varnish type composition using one of the epoxy resins formed in accordance with this invention:

*Example XIII*

In a one-liter three-necked flask provided with a mechanical agitator, a thermometer, and a reflux condenser attached through a water trap, was placed 37.5 parts of the epoxy resin formed in accordance with Example I and 50 parts of soya bean oil acids. Heat was applied and as soon as the mixture became sufficiently fluid (about 140° C.) agitation was started and continued throughout the reaction period. The temperature was gradually raised to 230° C. over a period of 1 hour. Sufficient xylene was added through the reflux condenser so as to fill the water trap and give constant reflux at 235–240° C. The reaction mixture was heated within this temperature range for a period of 3.5 hours at which time the acid value of the reaction mixture was 10. After cooling to 150° C., the esterified product was dissolved in xylene to give a varnish having a non-volatile content of 50%. To this varnish was added .02% cobalt as cobalt naphthenate, the percentage being based on the non-volatile content. A film of this product flowed on a glass plate to a wet film thickness of .003 inch and baked for a period of ½ hour at 150° C. gave a hard, tough, flexible product.

The invention in its broader aspects is not limited to the specific steps, methods, compositions, combinations, and improvements described but departures may be made therefrom within the scope of the accompanying claims without departing from the principles of the invention and without sacrificing its chief advantages.

What is claimed is:

1. The method of manufacturing a curable epoxy resin containing glycidyl groups comprising reacting in an alkaline medium at a temperature between about 50 to 150° C., a halohydrin selected from the group consisting of epihalohydrins and polyhalohydrins with a phenol condensation product selected from the group consisting of phenolphthaleins, phenolmaleins, phenolsucceins, phenolnaphthaleins and phenolsulfonephthaleins, the molar ratio of the halohydrin to the phenol condensation product being at least 2:1, the reaction medium being free of substantial amounts of water which would cause significant hydrolysis of the glycidyl groups of said epoxy resin.

2. The method according to claim 1 wherein the phenol condensation product is a phenolphthalein.

3. The method according to claim 1 wherein the phenol condensation product is a phenolmalein.

4. The method according to claim 1 wherein the phenol condensation product is a phenolsuccein.

5. The method according to claim 1 wherein the phenol condensation product is a phenolnaphthalein.

6. The method according to claim 1 wherein the phenol condensation product is a phenolsulfonephthalein.

7. An epoxy resin formed in accordance with the method of claim 1.

8. An epoxy resin formed in accordance with the method of claim 2.

9. An epoxy resin formed in accordance with the method of claim 3.

10. An epoxy resin formed in accordance with the method of claim 4.

11. An epoxy resin formed in accordance with the method of claim 5.

12. An epoxy resin formed in accordance with the method of claim 6.

References Cited in the file of this patent
UNITED STATES PATENTS 2,060,715     Arvin _____ Nov. 10, 1936